Dec. 29, 1970  B. J. GREEN ET AL  3,550,455
WHEEL BALANCING METHOD

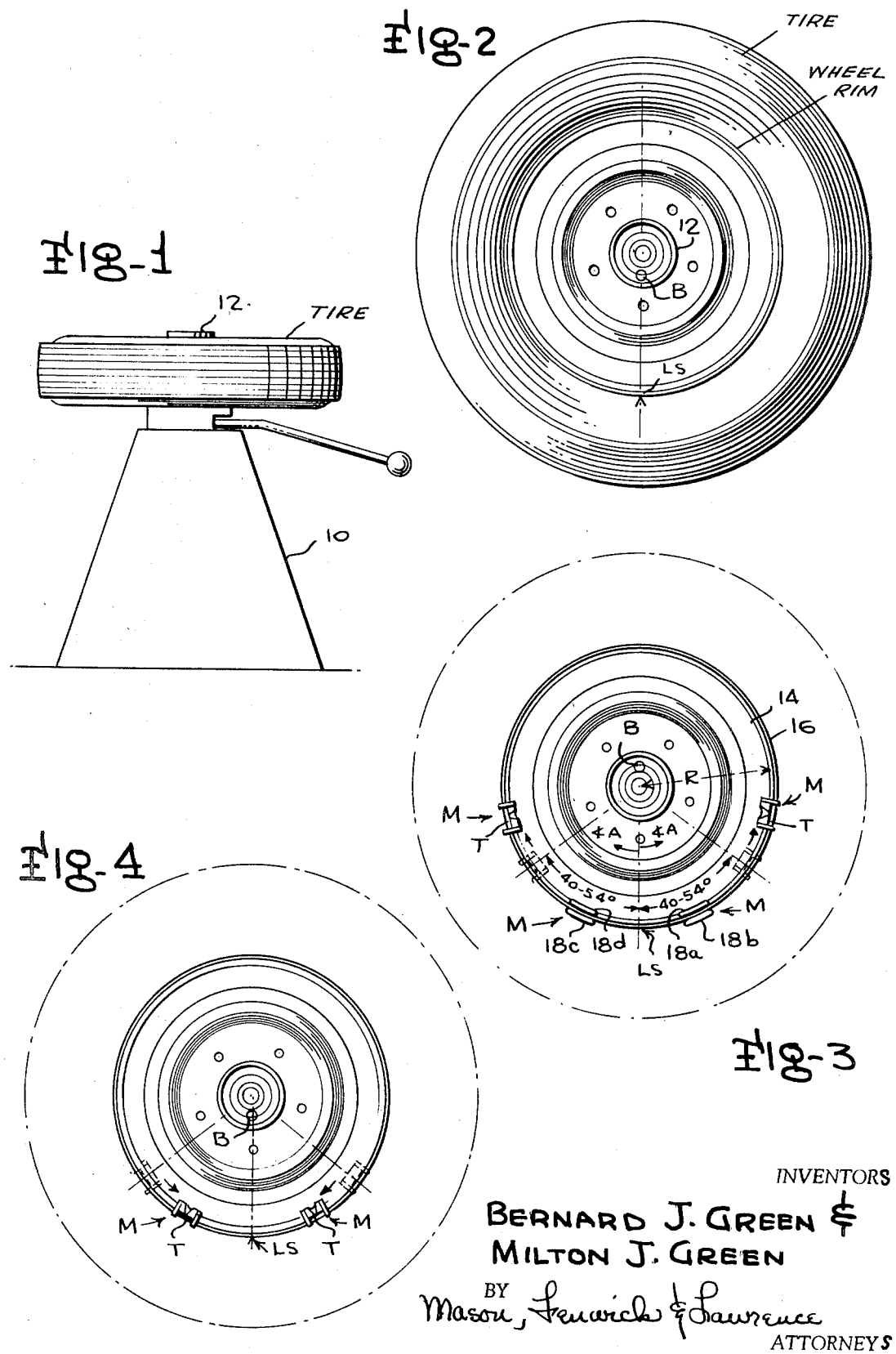

Filed Jan. 15, 1968  2 Sheets-Sheet 2

INVENTORS
BERNARD J. GREEN &
MILTON J. GREEN
BY Mason, Fenwick & Lawrence
ATTORNEYS

United States Patent Office 3,550,455
Patented Dec. 29, 1970

3,550,455
WHEEL BALANCING METHOD
Bernard J. Green, 905 Broad St., and Milton J. Green,
901 Anderson St., both of Bristol, Tenn. 37620
Filed Jan. 15, 1968, Ser. No. 698,053
Int. Cl. G01m 1/12
U.S. Cl. 73—483         5 Claims

ABSTRACT OF THE DISCLOSURE

A method using balance weights of a single weight value to balance any and all conventional vehicle wheels regardless of the amount by which each such wheel is unbalanced comprising placing the wheel horizontally on a wheel balancing apparatus for determining a light spot on the wheel, observing the light spot on the wheel as by viewing the position of the bubble on the apparatus located within the center of the wheel, placing a pair of equal double value weight masses on the wheel, each mass being initially positioned at an angle of approximately 40 to 54 degrees, preferably 45 to 50 degrees, from the light spot, moving each mass along the wheel symmetrically and uniformly toward or away from the light spot which may be circumferentially towards the position of the bubble until the wheel is balanced, noting the balancing position of the masses when the wheel is balanced, dividing each of the double value masses into or replacing the masses with a pair of single value weights, each of the single value weights being of a weight between .9 and 1.2 ounces, preferably the optimum size of 1.1 ounces, affixing one of each pair of weights on the upper side and on the under side of the wheel at the same balancing location.

---

This invention relates to a method for balancing wheels. More particularly, the present invention is concerned with a method for balancing all vehicle wheels with the same identical single value weights without the requirement of using different value weights.

Vehicle wheel balancing has, with the advent of high speed roads and more powerful and faster automobiles, brought about a need for balancing all wheels of the vehicle. Although methods of manufacture of the wheels and the tires used on vehicles today have greatly improved, such improvement has not kept pace with the added speeds with which such vehicles are capable.

Balancing vehicle wheels has become a sizeable industry and one in which competition is keen for the most economical and efficient wheel-balancing method and apparatus. Economy of operation may be obviously improved if two costly and time-consuming problems are overcome. First, the tremendous inventory of wheel balance weights required of the wheel balancing operator must be substantially reduced. Second, the labor time for the balancing operation is too long for ideal efficiency.

The large variety weight inventory has heretofore been thought to be necessary to meet the range of unbalance found in various sized wheels. At one time, weights differing in quarter ounces and ranging from one quarter to six ounces were required to be maintained in stock. Such a demand that a variety of weights be retained in inventory not only increases the cost of operating a wheel balancing method, but also in the event of an incomplete series of the various sized weights, it interferes with satisfactory customer service.

Labor time is the most expensive aspect of balancing wheels and any reduction in the time necessary to determine the proper choice of weights and the proper location for the weights would substantially improve the wheel balancing operation.

A number of methods have been developed in recent years which, attempting not only to limit the number of different sizes of weights but also to make the operation of the wheel balancing method more efficient. One such method is disclosed in our U.S. Pat. 3,251,230, issued May 17, 1966. In this patented method, the wheel was to be mounted on a conventional horizontal bubble balancing machine and the light spot noted, the lightest or smallest pair of weights selected from only three pairs of test weights marked, for instance, small, medium and large were placed adjacent the light spot since only at this spot was the full effect of the weights to be noticed. If such weights were found to overbalance or overcorrect the unbalanced wheel, as indicated by the bubble on the balancing machine, these were the weights to utilize to determine the correct balancing spot for the weights. If the weights were not successful in balancing or overcorrecting the unbalance of the wheel, the next large pair of weights for example medium test weights were to be used until the bubble of the balancer showed an overcorrection. The weights were then moved symmetrically and oppositely about the wheel rim away from the light spot until the wheel was in proper balance. Each of the weights was then removed and actual wheel weights, which were one half of the test weights used to correct the balance, were applied on the inside and outside rim at the same distance from the light spot.

This method was a successful method and has been in commercial use for a number of years. But it still required three different sized weights and best practiced by beginning at the light spot with the lightest weights and frequently working upwardly to the next size weight.

Another method that has been in commercial use is the method disclosed in the Bageman U.S. Pat. 3,002,388. This patented method differs from the previously described prior art method in that a set of four equal rim weights are placed on the rim of the wheel adjacent the point of maximum effectiveness, and the rim weights are then moved in pairs symmetrically and oppositely about the point of maximum effectiveness until the wheel is balanced. Weights are transposed from each pair to the opposite side of the wheel to effect a complete balancing. The weights that are used in this patented method are described in the specification to be of a weight value of .60, 1.60 and 2.25 ounces.

While this method has achieved a measure of success by also reducing in some respects the inventory that is to be required of different sized weights, it also required three different sized weights and necessarily began the balancing procedure with the lightest weights at the light spot or point of maximum effectiveness.

To date, no single size or value weight has been developed nor any method capable of balancing all wheels with the single size weight. Moreover, these prior art methods of fanning the weights to balance the wheel all necessarily started at the light spot so as to be certain that the lightest size weights were used. This starting point for the fanning of the weights is inefficient and time consuming since it is found that the final balancing point is generally quite remote from the light spot. The operator thus must move the weights a greater distance to the balancing position and consume valuable time and effort in doing so. When it is considered that the entire balancing operation should properly be no greater than a few minutes per wheel, this added time consuming effort on the part of the operator adversely affects the efficiency of the entire operation.

Accordingly, it is the primary object of the present invention to provide a method for balancing any vehicle wheels with single value weights that are affixed to the wheel.

Another object of the present invention is the provision of a method which avoids the time consuming choice of the proper weight size by the previous trial and error practice of beginning with the lightest weights and progressing when necessary upwardly to the heavier weights.

Another and important object of the present invention is to provide a wheel balancing method in which the balancing operator begins the balancing at a point more approximate to the final balancing point at which the lead weights are to be affixed.

Another object of the present invention is the provision of a method for utilizing test weights of double value mass and of dividing these test weights into single value weights to be affixed to the wheel.

Another object of the present invention is to simplify the wheel balancing method to minimize errors by the wheel balancing operator.

This invention also has as an important object the minimizing of the inventory that the wheel balancing operator must maintain in order to effectively balance vehicle wheels.

These and other objects of the present invention will become more apparent upon careful review of the following specification and drawings in which:

FIG. 1 is a side elevational view of a typical bubble balancing machine with a wheel horizontally positioned thereon ready for balancing.

FIG. 2 is a plan view of the wheel positioned on the wheel balancer of FIG. 1 showing no correction and no weights placed upon the rim and indicating the position of the light spot by the extreme location of the bubble.

FIG. 3 is a plan view similar to FIG. 2 but wherein test weight masses have been positioned on the wheel and showing overcorrection as indicated from the position of the bubble.

FIG. 4 is a plan view similar to FIG. 2 showing the position of the test weight masses and an undercorrection and the proper direction for movement of the test weight masses to achieve balancing.

The present invention utilizes an optimum size wheel balance weight in conjunction and in accordance with a unique wheel balancing method. Both the method and the optimum size wheel balance weight are mutually enhancing to achieve the most economical, the simplest, and most effective wheel balancing procedure.

Since the method of the present invention is based upon the use of a particular wheel balance weight of optimum size, the determination of this optimum size is one aspect of the present invention.

Figure 6:
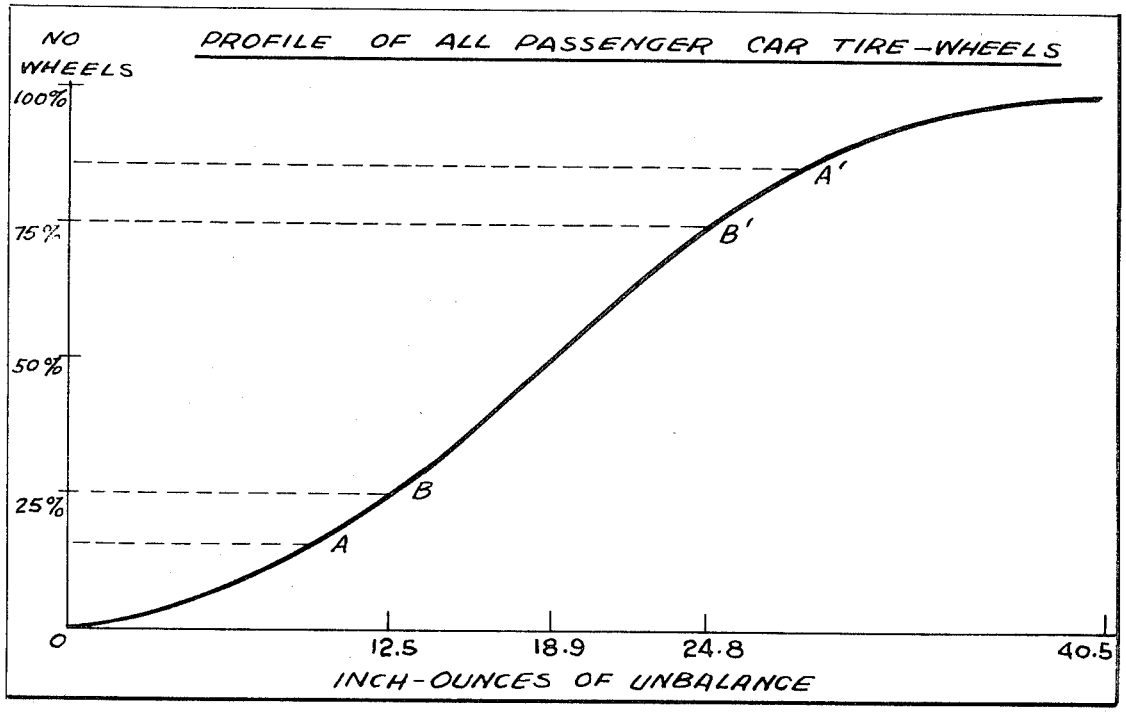
FIG. 6 is a plot of the distribution of anticipated unbalance.

In order to determine the optimum size wheel balance weight for balancing wheels with a single weight size, the typical distribution curve obtained from periodic sampling of tire unbalance is used. Such a distribution curve is known to the art having been determined and discussed in numerous technical papers. For example, Society of Automotive Engineers publication of March 1963, by J. Bajer entitled, "The Control of Tire Nonuniformity and a Passenger Car Manufacturer's Point of View," at FIG. 27, page 13. The typical shape of the distribution curve is shown in FIG. 6 as a plot of a number of wheels in terms of percentage of total wheels versus the amount of unbalance in inch-ounces. In this typically shaped curve, 70 percent of the curve as shown between A–A' excluding the first 15 and last 15 percent of the unbalance wheels is essentially linear. More particularly, it can be seen now that 50 percent of the unbalanced wheels B–B' on the curve vary from .67 to 1.33 times the average unbalance.

It has been found that the average unbalance is a predictable function of tire size and weight. Thus, if a certain size tire possesses a known distribution curve of unbalance, it is possible to predict the unbalance of another tire either larger or smaller by applying a factor representative of the weight, the size being virtually a constant for all passenger car tires and wheels as respects the inch-ounces of unbalance. When the curve of unbalance is found for a particular tire size, it would be similar in shape to that shown in FIG. 6. Such a distribution curve can be moved to the left to form a new distribution curve for the smaller wheel and tire assembly which would be expected to have less inch-ounces of unbalance, and correspondingly to the right for a larger wheel and tire assembly which would be expected to have greater amounts of unbalance.

In this manner, it was found to be possible to construct an expected average tire and wheel unbalance expressed in inch-ounces of unbalance for the entire range of wheels in common use but weighted according to the relative volume of sales of the various sizes of tires. For example, a profile of present day expected unbalance can be quite closely appoximated by taking one average tire size, 7.75–14, which tire size represents about 80 percent of the weight of the marimum tire-wheel assembly and applying the 80 percent factor to the distribution curve for the maximum tire assembly and combining the values in the two curves in proportion to their present volume of sales. In the present instance, a 9.50–14 tire was taken as maximum and representative of the upper 20 percent of the wheel and tires to be balanced. Such a composite plot which resulted from combining these factors is shown as FIG. 6. The shape of the curve is substantially identical with the single tire and wheel size, but its position along the abscissa is changed.

It of course is recognized that tire and wheel unbalance has been steadily minimized over the past period of years and presumably will continue to diminish. It may therefore be the result of such reduction of unbalance that the average curve of unbalance may shift further to the left.

Once the actual typical distribution curve has been obtained in the form shown in FIG. 6, it is possible to thereafter determine the optimum size weight which can most effectively balance any and all vehicle wheels.

From the curve, it can be determined that the median unbalance is 18.9 inch-ounces, and therefore if four weights are to be used and W equals the size of the weight in ounces, A the angular distance in degrees between the light spot (LS) and the final location of the correcting weight, R the radius to the correcting weight from the vertical axis of the wheel on the balancer (see FIG. 3), then the following formulas express the effectiveness in inch-ounces of the correcting weight when four or six weights are used:

$$4WR \cos A \text{ and } 4WR \cos A + 2WR$$

In the latter formula, the 2 WR represents two weights at the light spot. Beginning with a correcting weight of one ounce in a radius of 7 inches, as would be the case with a 14-inch wheel, then angle A can be determined to be approximately 47½ degrees. This would mean that by starting at an angle of 47½ degrees away from the light spot with a pair of suitable test weights, it would be possible to balance one half of the wheels by moving towards the light spot and the other half of the wheels by moving away from the light spot, although always moving towards the direction of the bubble B.

On this basis it is possible to determine for any value of W the percentage of wheels that can be balanced entirely by four weights spread from the light spot up to that point in which the two test weight masses would necessarily come together at the light spot and it is no longer possible to affix the weights closer. What has occurred mathematically is that the angle A has diminished to zero (the cosine of which is one) and still four times the weight acting through the radius is not sufficient to equal the amount of actual inch-ounce unbalance. In such a case, it can be seen that the size of the weight used would necessarily limit the number of wheels in unbalanced condition that could be balanced with four weights. Even if six weights were used and the weight size were low, for example, .7 ounce, it would be impossible to balance all wheels even using six weights since the maximum effectiveness of six weights of .07 ounce each on a 14-inch wheel would be approximately 29.4 inch-ounces— far less than the apparent maximum inch-ounces of unbalance of over 40. Thus, it would be necessary to use ten weights of .7 ounce to be assured of balancing the most unbalanced wheels. Of course, it would be absurd to load any wheel up with such a number of weights. Accordingly, .7 ounce weight is not the optimum weight size.

It has been found that the optimum size weight determined in accordance with the procedure set forth above is between .9 and 1.2 ounces, preferably 1.1 ounces.

With four 1.1-ounce optimum weights, it has been detrmined that it is possible to balance 90 percent of all presently existing wheels and with six weights of 1.1 ounces optimum weight, it is possible to balance the remaining 10 percent of presently existing wheels. In determining the optimum weight size, consideration must be given to the smallest number of highly unbalanced wheels that cannot be balanced with four weights only, along with the minimum number of highly unbalanced wheels that cannot be balanced with six weights. When the full range of approximately 100 percent of the wheels would be covered, it is considered to be relatively certain that all wheels should be able to be balanced with such weight size.

Once the optimum size weight was determined, it was then necessary to develop a new balancing method that would be properly able to exploit the use of a single optimum weight size for all vehicle wheels.

For purposes of this invention, it has been found that it is preferable to utilize specially designed test weight masses which are of double value optimum size or 2.2 ounces. These test weights T are each double value masses M and are particularly designed to be used in balancing wheels when a fanning operation is required about the light spot (LS). Such test weight masses as disclosed in our Pat. 3,251,230 are preferred because of their unique ability to slide freely and easily about the rim.

It is also possible to utilize the method of the present invention with the actual wheel weights that are to be affixed to the rim of the wheel. In such case, two actual wheel weights each 1.1 ounces optimum size would be used in lieu of the optimum size test weight mass.

Utilizing the test weight procedure, the method of the present invention may be practiced by (1) Placing the tire wheel assembly on the balancer 10 and observing the position of the bubble B which necessarily migrates to the light spot in the ring 12 as shown in FIG. 2.

(2) One pair of test weights M are placed on the rim between 40 and 54 degrees from the position of the light spot as shown in phantom lines in FIG. 3, preferably 47½ degrees on either side of the light spot. In such position, approximately half the tires and wheels will be balanced by moving the test weights towards each other, and the other half corrected by moving the test weight masses away from each other.

Figure 5:
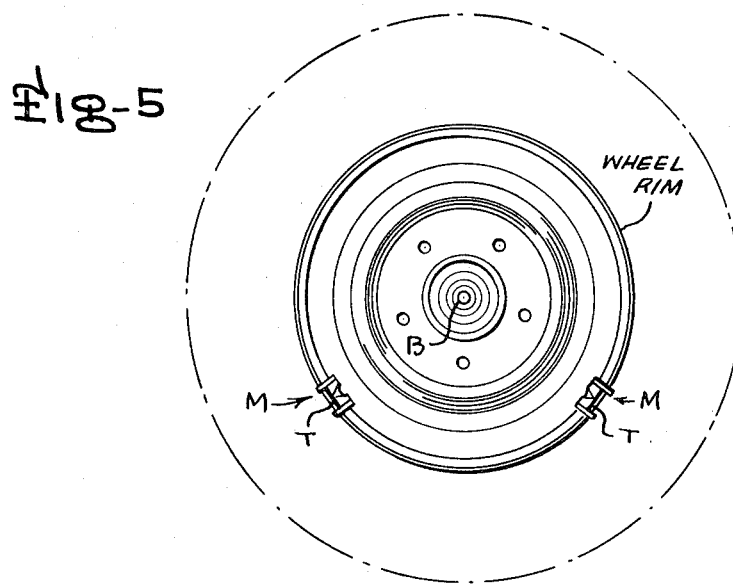
FIG. 5 is a plan view of the wheel in balance position and showing the bubble in the center.

As soon as the test weights are placed on the rim, the bubble B will probably move into the position of either FIG. 3 or FIG. 4. The operator should observe the position of the bubble and slide each of the test weight masses circumferentially and symmetrically about the wheel rim in the direction of the bubble until the bubble returns to the center of the level. For instance, in FIG. 3, it can be seen that the weight masses positioned at the phantom line location overcorrect the unbalanced condition of the wheel and, accordingly, the weight masses would have to be moved in the direction of the arrows to the position indicated in solid lines. As the weight masses are moved from the phantom line to the solid line position, the bubble will be seen to gradually move towards the center. Continual movement of the test weight masses in the correct direction will finally result in the bubble being in the exact center as shown in FIG. 5. At this time the wheel is balanced and now it is only necessary to replace or divide the test weight masses which are of double value into two actual wheel weights each. The position of the test weight masses should be noted as the balanced position and the test weight masses removed while two angle value actual wheel weights of conventional shape and design except they are of the optimum size are substituted, one being affixed on the upper side of the rim and the other on the under side of the rim. The same procedure is done for both the test weight masses.

When this operation is performed carefully and correctly, it is not necessary to check the balancing of the wheel by replacing the wheel with the optimum size wheel weights again on the balancer. While the above procedure will be effective for 90 percent of all unbalanced wheels, the remaining 10 percent of wheels can be balanced simply by noting that when the test weight masses are placed on the wheel rim, the bubble would be in the position as shown in FIG. 4, and movement of the test weight masses towards the light spot (LS) as shown in FIG. 4 would result in the bubble still not being positioned in the center. Then the wheel may be removed from the balancer after noting the position of the light spot and affixing two single value optimum size weights, one on the upper side of the wheel at the light spot, and the other on the under side of the wheel again at the light spot and replace the wheel on the balancer. Instead of removing the wheel a third test weight may be placed at the light spot. The wheel then having two optimum size weights already in position can be balanced as previously stated with the test weights.

While it is preferable to use the test weight masses of double value, the procedure of the present invention is also adaptable to the use of the actual wheel weights instead of the test weight masses.

In the procedure using the actual wheel weights instead of the test weight masses T, a pair of the actual single value optimum weights forming double value masses M are each placed approximately 40 to 54 degrees about the light spot after the wheel has been placed on the balancer (see FIG. 3). The weights may be stacked as shown at 18a, 18b, 18c and 18d, which is preferable, or placed one in the flange well and one on the outside of the flange well. Then, in accordance with the position of the bubble, whether it takes a position of overcorrection as in FIG. 3 or undercorrection as in FIG. 4, the pairs of actual single value optimum size wheel weights are moved in the direction of the bubble as previously stated until the wheel is balanced as seen in FIG. 5. The balancing position is noted and the weights removed and the weight masses divided such that one optimum wheel weight is affixed to the upper side of the wheel rim and one to the lower side of the wheel rim on each side of the light spot at the balancing location or position. The wheel is then balanced and ready for mounting on the vehicle.

As in the test weight procedure, when the use of two pairs of optimum size weights fails to move the bubble into the center two optimum size wheel weights must be affixed to the light spot, one at the under side and the other at the upper side of the wheel rim.

With the procedure as set forth, it is manifest that the wheel balancing operator need maintain an inventory of only a single optimum size wheel weight for balancing any and all vehicle wheels of a passenger car and some small truck type tires.

The importance of the method of the present invention in which the balancing operator begins the operation for balancing at a point between 40 and 54 degrees from the light spot, most frequently the balancing position is found within this angular range and therefore beginning at this point saves considerable time and effort and exerts less wear and tear on the operator. It is only because of the use of a single value optimum size weight for all wheels that beginning the fanning operation as in FIGS. 3 and 4 near the final balancing point is made possible. No other procedure which utilizes several different weight sizes could possibly use the present method since all requirements for the multiple sized weights require that the procedure begin at the light spot in order to use the least amount of weight possible.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What is claimed is:

1. A method using balance weights of a single weight value to balance any and all conventional vehicle wheels regardless of the amount by which each such wheel is unbalanced comprising placing the wheel horizontally on a wheel balancing apparatus for determining the light spot on the wheel, observing the light spot on the wheel, placing a pair of equal double value weight masses on the wheel, each mass at an angle of approximately 40 to 54 degrees from the light spot, moving each mass along the symmetrically and uniformly until the wheel is balanced, noting the balanced position of said masses, dividing each said mass into a pair of single value weights, affixing one of each pair of weights on both the upper side and under side of said wheel at the same balanced location, the size or single value of each of the weights affixed to the wheel being the same for all wheels, the size or single value of each weight being such that 4 such weights will balance substantially 90 percent of all conventional vehicle wheels, and that 6 such weights will balance substantially the remaining 10 percent of such conventional vehicle wheels, the percentages of such wheels balanceable being determined from the "profile of all passenger car tire wheels" formed similarly as shown in FIG. 6.

2. The method of claim 1 wherein each said double value weight mass is a single trial weight.

3. The method of claim 1 wherein each said double value weight mass is a pair of single value weights.

4. The method of claim 1 including adding weights at the light spot prior to moving each said mass symmetrically and uniformly to the balanced position.

5. A method using balance weights of a single weight value to balance any and all conventional vehicle wheels regardless of the amount by which each such wheel is unbalanced comprising placing the wheel horizontally on a wheel balancing apparatus for determining the light spot on the wheel, observing the light spot on the wheel, placing a pair of equal double value weight masses on the wheel, each mass at an angle of approximately 40 to 54 degrees from the light spot, moving each mass along the wheel symmetrically and uniformly until the wheel is balanced, noting the balanced position of said masses, dividing each of said mass into a pair of single value weights, the value of each said weight being 0.9–1.2 ounces, affixing one of each pair of weights on both the upper side and under side of said wheel at the same balanced location, the size or single value of each of the weights affixed to the wheel being the same for all wheels.

References Cited

UNITED STATES PATENTS

| 2,052,295 | 8/1936  | Hume      | 73—480 |
| 2,697,345 | 12/1954 | Currier   | 73—487 |
| 3,002,388 | 10/1961 | Bageman   | 73—483 |
| 3,085,442 | 4/1963  | Bageman   | 73—483 |
| 3,251,230 | 5/1966  | Green et al. | 73—487 |

JAMES J. GILL, Primary Examiner